United States Patent
Russ et al.

(10) Patent No.: US 7,636,638 B2
(45) Date of Patent: Dec. 22, 2009

(54) HYBRID RADIATION DETECTION SYSTEM

(75) Inventors: William Robert Russ, East Hampton, CT (US); Massimo Morichi, Madison, CT (US)

(73) Assignee: Canberra Industries, Inc., Meriden, CT (US)

( * ) Notice: Subject to any disclaimer, the term of this patent is extended or adjusted under 35 U.S.C. 154(b) by 48 days.

(21) Appl. No.: 11/945,851

(22) Filed: Nov. 27, 2007

(65) Prior Publication Data

US 2009/0134337 A1 May 28, 2009

(51) Int. Cl.
*G01N 31/00* (2006.01)

(52) U.S. Cl. .................. 702/22; 250/363; 250/370.01; 250/370.13; 702/76; 702/85

(58) Field of Classification Search ............... 702/76, 702/85, 22; 250/363.02, 370.01, 363, 370.13; 252/644

See application file for complete search history.

(56) References Cited

U.S. PATENT DOCUMENTS

| | | | |
|---|---|---|---|
| 6,194,726 B1 | 2/2001 | Pi et al. | |
| 6,333,504 B1 * | 12/2001 | Lingren et al. | 250/370.01 |
| 6,528,797 B1 | 3/2003 | Benke et al. | |
| 6,949,748 B2 | 9/2005 | Ziock et al. | |
| 7,064,336 B2 | 6/2006 | Archer et al. | |
| 7,065,473 B2 | 6/2006 | Warburton et al. | |
| 7,105,828 B2 | 9/2006 | Unger et al. | |
| 7,223,982 B1 * | 5/2007 | Chen et al. | 250/370.13 |

OTHER PUBLICATIONS

Donald D. Burgess, "A Comparison of Methods for Baseline Estimation in Gamma-Ray Spectrometry", Nuclear Instruments and methods in Physics Research, vol. 221 (1984), pp. 593-599.

George Schulze et al., "Investigation of Selected Baseline Removal Techniques as Coandiates for Automated Implementation", Applied Apectroscopy, vol. 59, No. 5, pp. 545-574 (2005).

NDA 2000 Technical Reference Manual, Version 5.1, "Spectrum Shifting", pp. 152-153, Canberra Industries, Inc. 2007.

W. H. Press, S.A. Teukolsky, W.T. Vetterling, B.P. Flannery, Numerical Recipes, the Art of Scientific Computing, Third Edition, pp. 641-648, Cambridge University Press, NY 2007.

(Continued)

*Primary Examiner*—John H Le
(74) *Attorney, Agent, or Firm*—David W. Carstens; Steven H. Washam; Carstens & Cahoon, LLP

(57) ABSTRACT

A system for combining the spectral data from multiple ionizing radiation detectors of different types and having different photopeak energy resolutions. First, baseline estimation is performed on each spectral histogram separately, discerning peak regions from underlying continuum using respective peak response functions. All spectra are subsequently rebinned to the same energy calibration and the peak spectra are convolved to produce a single convolution spectrum. All peak counts are redistributed locally according to the convolution spectrum in energy regions proportional to respective local energy resolution. The summation of these redistributed peak spectra can then be analyzed as a single spectrum using a common photopeak response and energy calibration. This process can be embodied in software or firmware. A preferred hybrid system might include a combination of lower resolution, higher efficiency detectors and higher resolution, lower efficiency detectors.

18 Claims, 6 Drawing Sheets

OTHER PUBLICATIONS

Genie 2000 Customization Tools Manual, "Peak Erosion", pp. 272-274, Canberra Industries, Inc. 2006.

Couture, Aaron et al., "Closing the Cold CNO Cycle: A New Measurement of 19F(p,g)", International Symposium on Nuclear Astrophysics - Nuclei in the Cosmos-IX, Jun. 25-30, 2006.

Price, John C., "Combining Multispectral Data of Differing Spatial Resolution", IEEE Transactions on Geoscience and Remote Sensing 1999, vol. 37. 3, pp. 1199-1203.

Barton, J.B., & Hoffman, E.J., "A High Resolution Detection System for Positron Tomography", IEEE Transactions on Nuclear Science, 1983 vol. NX-30, No. 1, pp. 671-675.

* cited by examiner

HYBRID RADIATION DETECTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to ionizing radiation detection systems, and more specifically, to a system and method for combining spectral data from disparate ionizing radiation detectors to obtain a standard radiation analysis.

2. Description of Related Art Including Information Disclosed Under 37 CFR 1.97 and 1.98

Use of ionizing radiation detectors is well known. For spectroscopic ionizing radiation detection and measurement, performance is limited by various traits of the detector. For example, the detector's efficiency is limited by its size and intrinsic efficiency while the size is limited by manufacturing restraints specific to the detector type. The detector type also dictates its energy resolution, a key characteristic determining the quality of acquired data. The cost for such detectors is typically proportional to the aforementioned size and resolution capabilities.

The efficiency of a spectroscopic ionizing radiation measurement system can be improved by adding more detectors to the system. Historically, this has been done using detectors of the same type, each with the same peak response function. Summing measured spectra of like detectors after matching energy calibrations allows analysis of the final summed spectrum using the common peak response function.

An example of an application in which multiple detectors are commonly used is a traffic portal. Homeland security employs the use of radiation detection traffic portals through which vehicular traffic must pass. These portals are designed to scan cars, trucks, and other vehicles for the presence of radioactive materials.

Current spectroscopic portal systems typically use either an array of 4"×4"×16" NaI(Tl) detectors or large HPGe semiconductor detectors. The scintillator system operates at room temperature and is able to employ a much greater mass of active detector volume for better efficiency at lower cost than HPGe. However, HPGe energy resolution is about 20-30 times better than NaI(Tl). The excellent energy resolution of HPGe allows greater confidence in coping with source masking scenarios and avoidance of excessive false positive identifications. Still, the burden of cryogenic cooling requirements and higher cost of HPGe per unit volume limits the degree of deployment.

Because all detectors are limited as to size, multiple detectors must be used in such a portal to monitor a broad area. This plurality of detectors is configured in an array. The common means for obtaining a reading from a multiple detector array is to simply sum the outputs and analyze the final summed spectrum. However, this requires detectors with the same peak response functions and energy resolutions. For a given cost, this requires a choice between either higher efficiency or higher energy resolution.

This traditional approach does not support combining different types of detectors with very different peak response functions. Further, attempting to use such standard summing in a system having different types of detectors would result in a summed spectrum with a complex multi-modal peak response function that would preclude standard analysis. Accordingly, a need exists for an ionizing radiation detection system and method that allows use of multiple detectors of different types and having different capabilities. The present invention satisfies this need and others as explained and described in the following detailed description.

BRIEF SUMMARY OF THE INVENTION

A novel hybrid detection system is described for combining spectroscopy detector spectra with differing peak response functions that still allows standard analysis. This hybrid detection system combines detectors of different types into a single spectroscopy system. One or more high efficiency/low resolution detectors are combined with one or more low efficiency/high resolution detectors. Thus, higher efficiency and better energy resolution can be achieved in a single system at limited cost due to this unique combination. A much greater variety of performance and cost combinations are made possible.

Various embodiments of the hybrid detection system include the combination of detectors such as:

(a) a large NaI(Tl) scintillation detector combined with a small HPGe semiconductor detector;

(b) a small NaI(Tl) or CsI(Tl) scintillation detector combined with a smaller CZT semiconductor detector;

(c) a large NaI(Tl) scintillation detector combined with a smaller LaBr3(Ce) scintillation detector;

(d) a NaI(Tl) detector combined with a HgI detector; and (e) a NaI(Tl) detector combined with a CdTe detector.

(f) a BGO detector combined with LaBr or NaI or CdZnTe or HPGe (g) whatever combination of two or multiple detectors based on scintillation technique (BGO, NaI(Tl), LaHa, LaCl, HgI, etc. in solid and liquid phase) and/or based on a solid state ionization crystal (like HPGe, CdTe, CdZnTe, SiLi etc.) or gas detectors like Xenon detectors or a kind of noble gases based detectors.

In the method for the preferred embodiment all individual system detectors must have well calibrated peak response functions and be exposed to the same sources during spectrum acquisition. Baseline estimation is performed on each acquired spectrum to separate the measured peak response from the underlying continuum. The resulting peak spectra are all rebinned to a common energy calibration. Then the peak spectra are multiplied by channel to yield a convolution spectrum. Counts in each peak spectrum channel are then redistributed to match the local convolution spectrum distribution with a window width set according to the respective detector local characteristic peak width. The final spectrum is the summation of all the redistributed peak spectra.

Preferred embodiments of method can be deployed in either software or hardware. Firmware implementations can be constructed with the algorithms embedded in processors such as Field Programmable Gate Arrays (FPGA), Application Specific Integrated Circuits (ASIC) and System on a Chip (SoC) embodiments.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, in which like reference numbers refer to like parts throughout the views, wherein.

Figure 8:
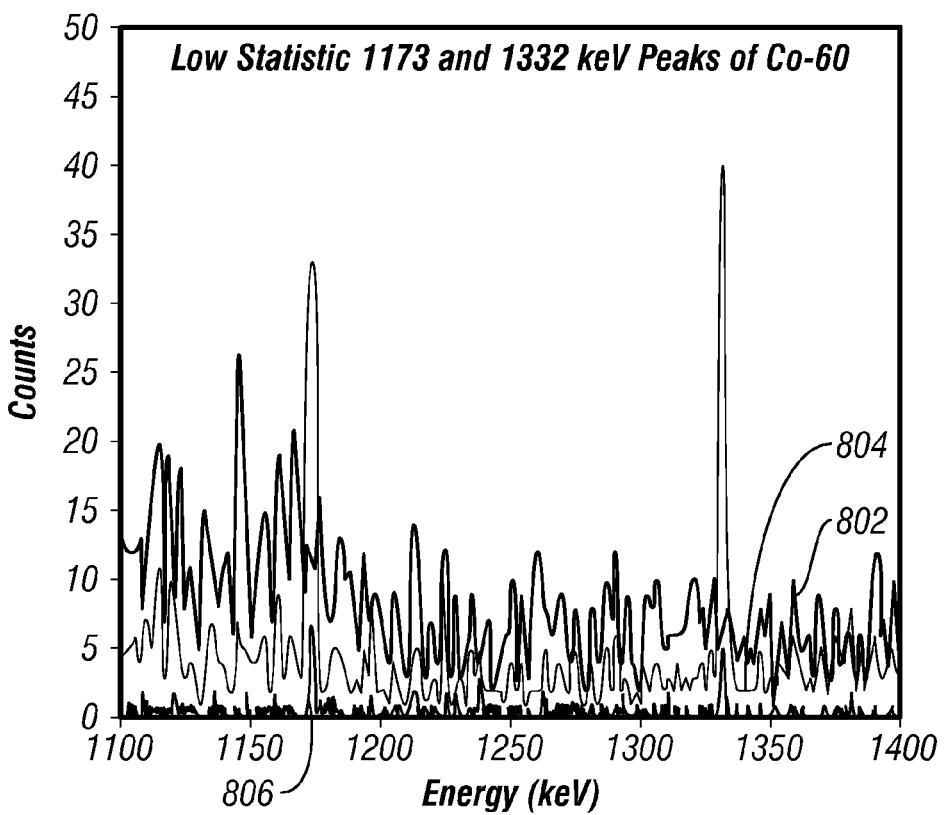
Figure 9:
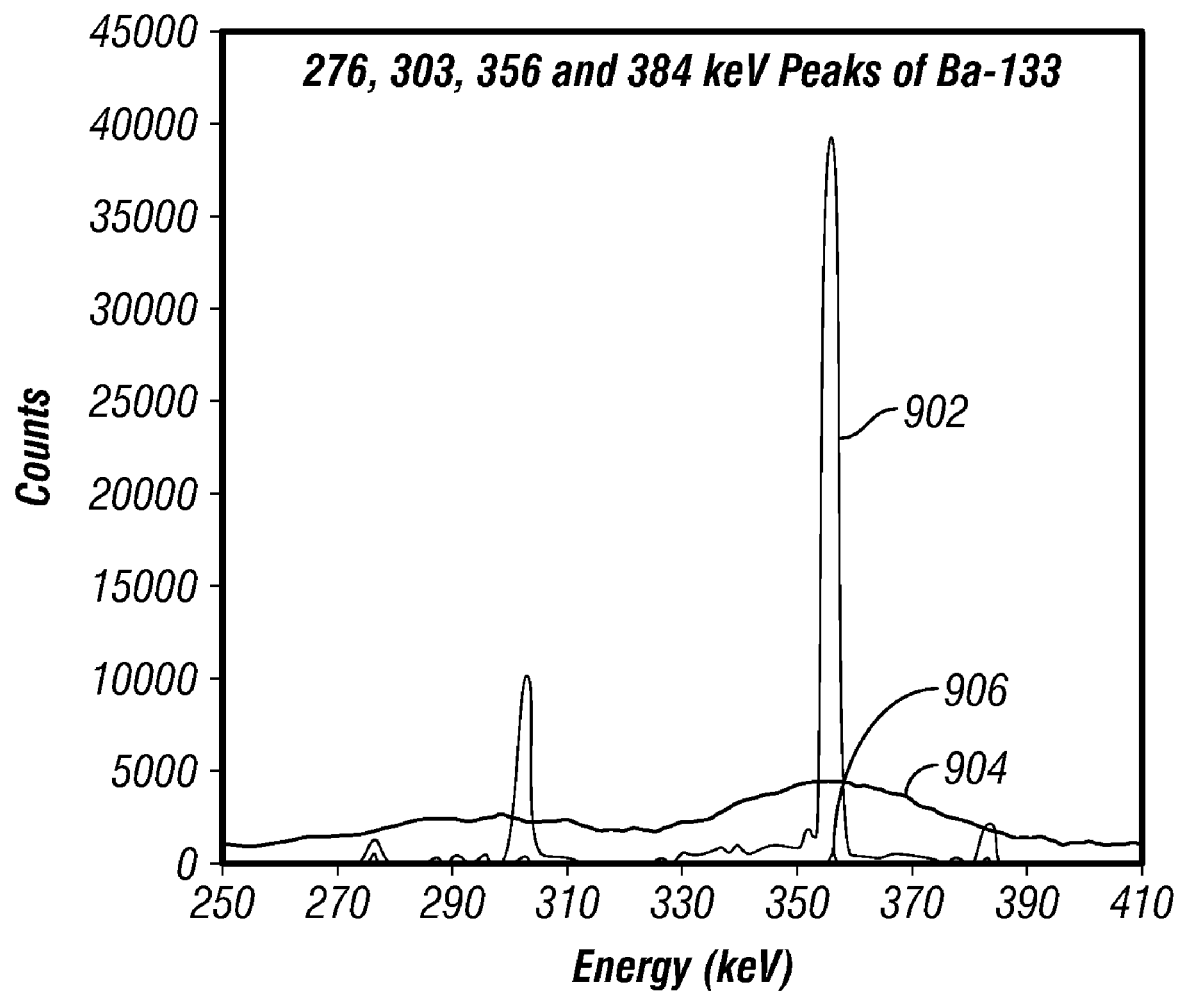

FIG. 8 is a graph of a section of spectrum around the 1173 and 1332 keV peaks of $^{60}$Co with low statistical significance, wherein the hybrid spectrum enhances the distinctiveness of the signal compared to either the NaI(Tl) or HPGe individually; and FIG. 9 is a graph of a section of spectrum around the 276, 303, 356 and 384 keV peaks of $^{133}$Ba with good statistical significance, wherein the ability to accurately locate overlapping peaks in the lower resolution NaI(Tl) spectrum is enhanced in the hybrid spectrum, leveraging the higher resolution HPGe data Where used in the various figures of the drawing, the same reference numbers designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
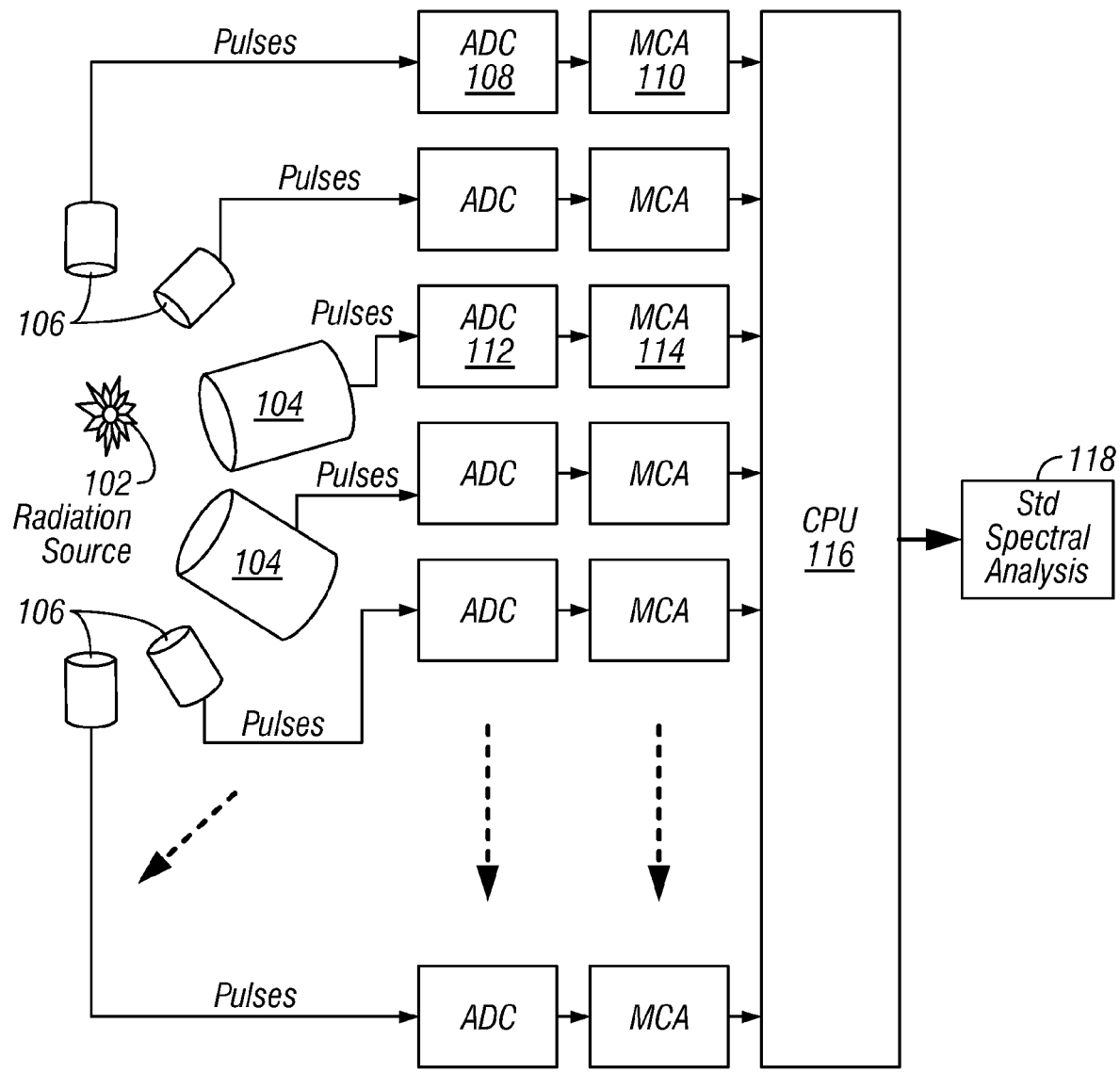
FIG. 1 is a schematic diagram representing an embodiment of the present invention featuring multiple detectors of different type and having different operational characteristics.

FIG. 1 shows a schematic representation of an embodiment of the present invention. This embodiment depicts a gamma source (102) being detected by multiple ionizing radiation detectors (104 and 106). The multiple detectors include some that feature high efficiency with low resolution (104) and some that feature low efficiency with high resolution (106).

The high efficiency/low resolution (HE/LR) detector (104) sends its pulse output to signal output processing electronics (i.e., preamplifier, amplifier). This signal feeds an analog to digital converter (ADC, 112) which in turn feeds a multi-channel analyzer (MCA, 114). Likewise, the low efficiency/ high resolution (LE/HR) detector (106) sends its pulse output to signal output processing electronics (i.e., preamplifier, amplifier). This signal also feeds an analog to digital converter (ADC, 108) which in turn feeds a multi-channel analyzer (MCA, 110). For each additional detector, there are such duplicate elements (ADC/MCA). Although analog pulse processing is described, one skilled in the art will appreciate that a Digital Signal Processor (DSP) may also be utilized to perform the requisite detector pulse processing.

Figure 2:
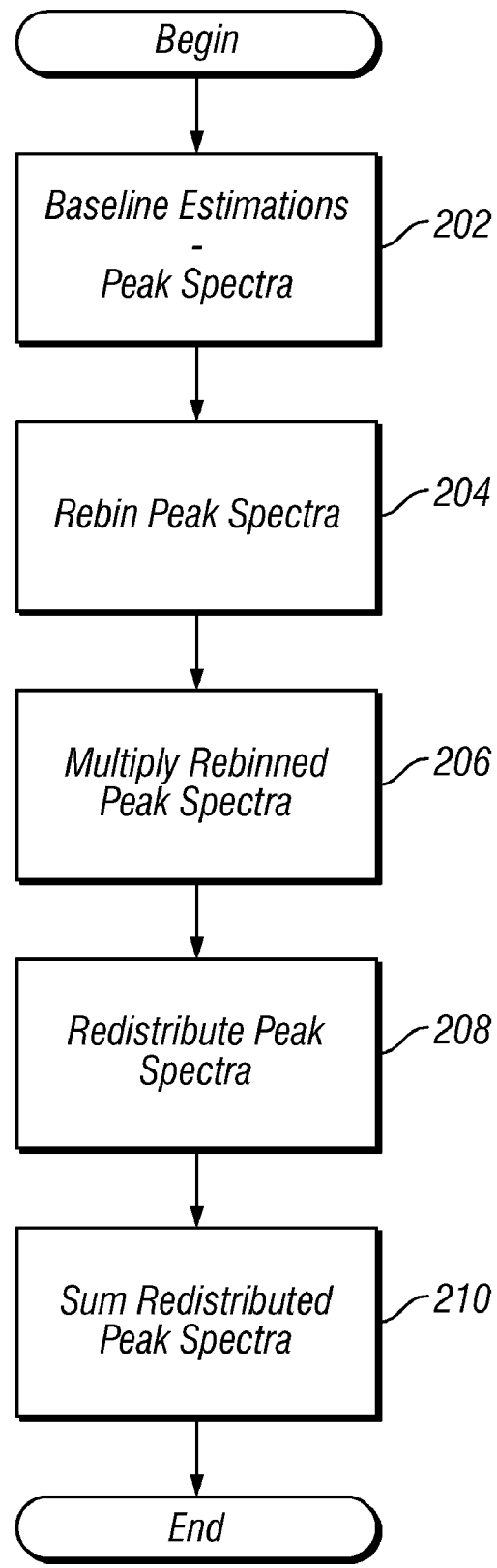
FIG. 2 is a flow diagram representing the process for combining spectra from multiple ionizing radiation detectors in accordance with the preferred embodiment of the claimed invention.

The outputs from each detector's MCA (110, 114, and the like) are subsequently fed to a central processing unit (116). This processing unit (116) performs novel processing steps to combine the multiple inputs into a single final spectrum. FIG. 2 depicts the method steps performed by the present embodiment. The method steps are illustrated with an ideal simulated example using a low resolution, high efficiency detector being combined with a high resolution, low efficiency detector. Both detectors are depicted measuring two equal adjacent peaks.

Baseline Estimations→Peak Spectra

To begin, the system takes a count of the source and determines the portion of the spectrum associated with monoenergetic photopeak responses using the expected peak shape according to the peak shape calibration (202). This has been done using peak erosion with an iterative filter tuned to the local full width at half maximum calibration, although other baseline estimation methods would also suffice. All counts above the baseline are designated as the peak spectrum while all counts below the baseline are designated as the continuum spectrum.

Rebin Peak Spectra to the Common Energy Calibration

Next, the system redistributes the peak spectra to a common histogram with a given number of channels and energy calibration, usually associated with the spectrum with the fewest channels (204). Counts in peak spectrum bins are assigned to bins in the common histogram based on the fractional relative overlap of respective bin energy ranges.

Figure 3:
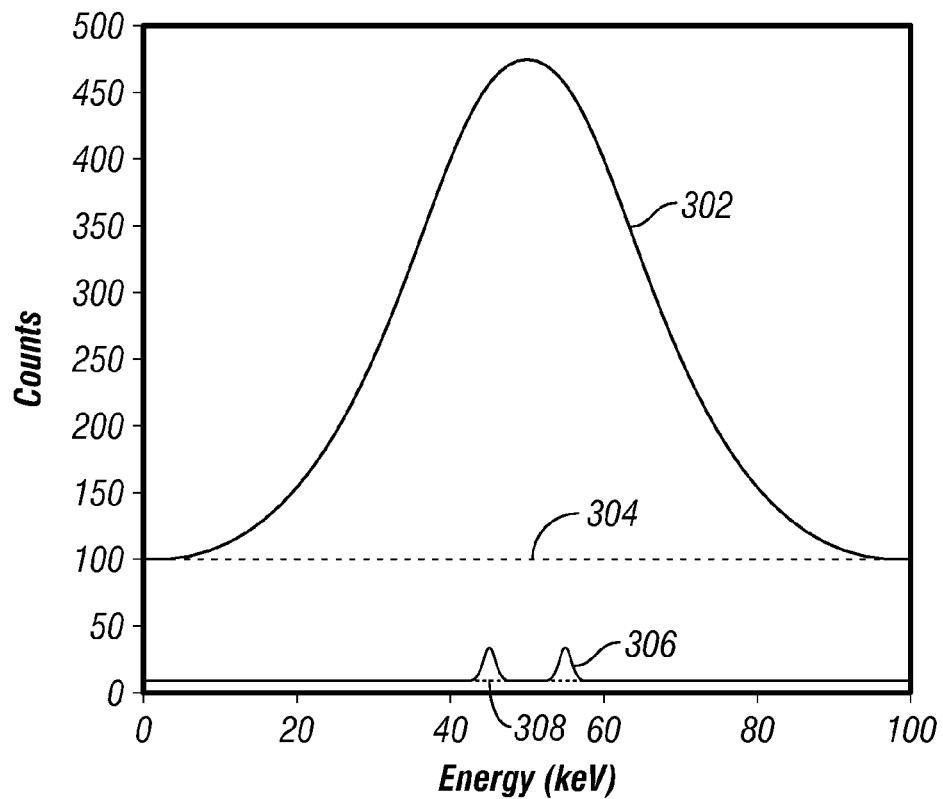
FIG. 3 is a graph of an ideal simulation showing the results of baseline estimation and rebinning to match energy calibrations. Both spectra show the response to two peaks with centroids at energies 45 keV and 55 keV.

FIG. 3 shows a graph of the resulting baseline estimations. This figure shows the curve generated by a HE/LR detector (302) and the curve generated by a LE/HR detector (306). The resulting HE/LR curve is divided into the photopeak spectrum (302) and the continuum spectrum (304). The resulting LE/HR curve is divided into the photopeak spectrum (306) and the continuum spectrum (308).

Multiply Rebinned Peak Spectra by Channel→Convolution Spectrum

Figure 4:
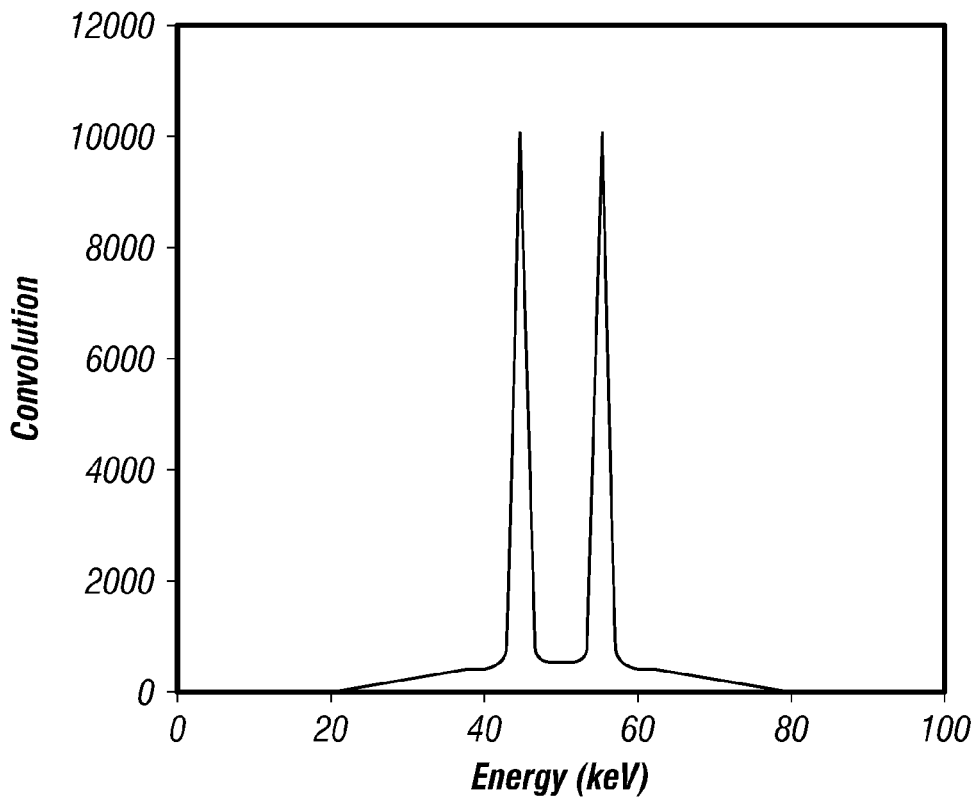
FIG. 4 is a graph of a convolution spectrum derived from the ideal simulation data. This common distribution will direct the redistribution of peak counts from both of the constituent spectra.

Next, the system adds respective channel uncertainties to the peak spectra and then multiplies the results from all spectra by channel. The result is the convolution spectrum (FIG. 4). The distribution of the convolution spectrum will tend to emphasize common positive response in regions that correlate in all peak spectra and have less emphasis in regions where the peak response is uncorrelated or not significant with respect to channel uncertainty. The degree of this effect can be controlled by adjusting the exponent of this convolution or the amount of uncertainty. A plausible range of the exponent value might be from 0.5 to 4, depending on the number of detectors and application conditions. An empirical optimization may be required for a given implementation.

In another embodiment, the convolution spectrum is generated by multiplying the respective peak correlation spectra by channel rather than the peak spectra. Peak correlation spectra are generated by calculating a normalized correlation coefficient between the peak spectrum and a calibrated peak shape being scanned across the peak spectrum.

Redistribute Peak Spectra to Match Local Convolution Distribution

Next, the system redistributes counts in peak spectral channels according to the relative fraction of the convolution spectrum channels in a peak wide region around each channel. The region width is determined by the local peak width for the respective spectrum. Counts in the peak spectrum bins are reassigned to bins in the local region according to the percentage of convolution spectrum counts in each bin relative to all of the convolution counts in the region.

Sum Redistributed Peak Spectra→Final Spectrum

Finally, the system adds the redistributed peak spectra to yield the final combined spectrum. This combined spectrum can be separately calibrated, but will conform to the common energy calibration and approximate the shape calibration of the better resolution detector. The continuum spectra can be optionally added after rebinning to match the common energy calibration, if needed for subsequent analysis.

Figure 5:
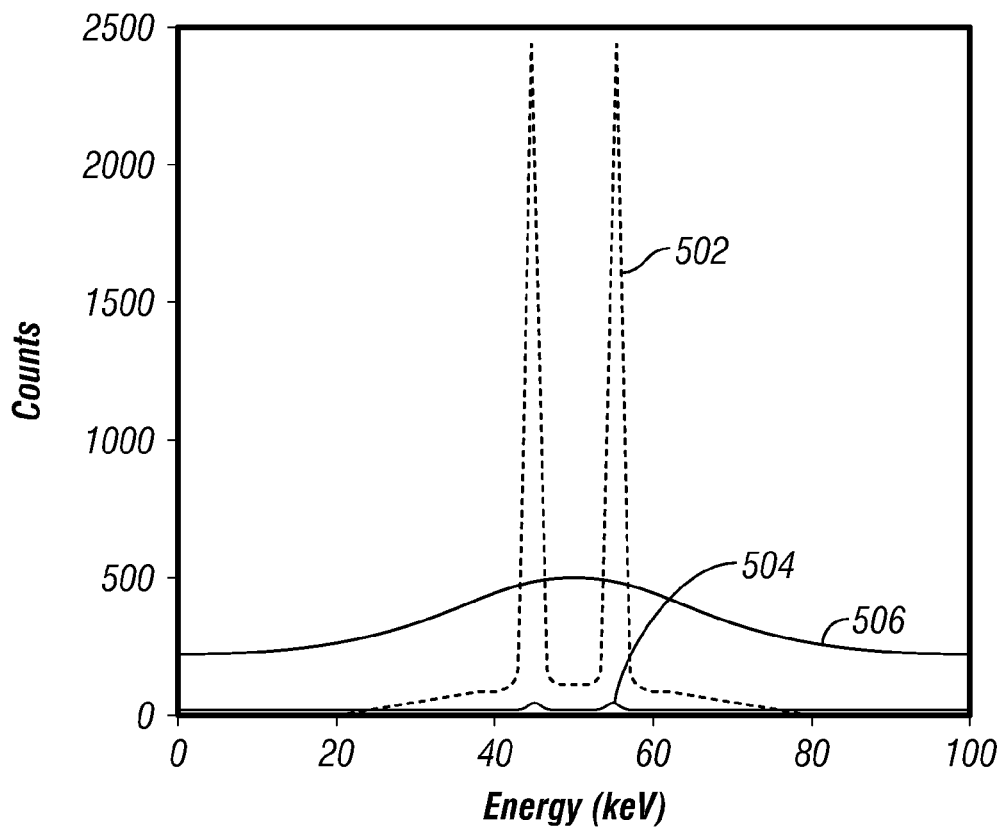
FIG. 5 is a graph of the final combined Hybrid spectrum after summing the peak spectra, redistributed according to the convolution spectrum, with the original measured spectra overlaid for comparison.

FIG. 5 shows a graph of the final resulting spectrum for this example, overlaid with the original spectra. The output of the hybrid system (502) is compared with the HE/LR redistributed spectrum (506) and the LE/HR redistributed spectrum (504). The hybrid final spectrum (502) most closely represents the shape of the LE/HR detector spectrum (504).

Figure 6:
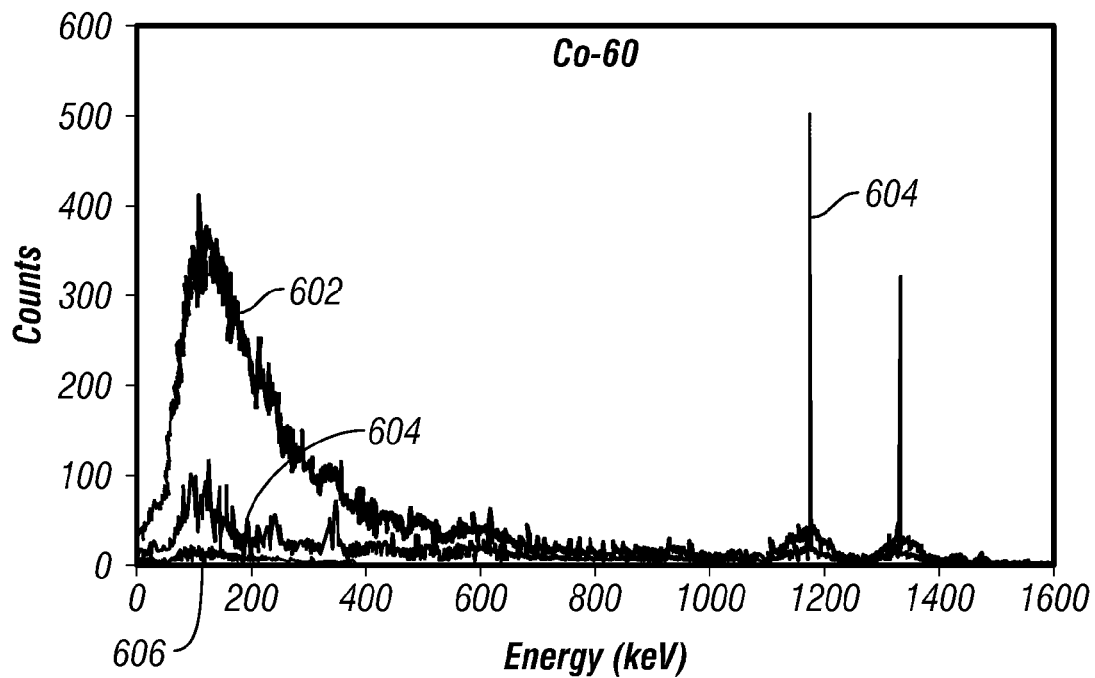
FIG. 6 is a graph of the result of combining spectra from a 3"×5"×16" NaI(Tl) and 45% coaxial HPGe detector (experimental data)

Some measurements have been processed using the described method to combine the spectra from a 3"×5"×16" NaI(Tl) detector and a 45% standard coaxial Ge detector. These examples illustrate some of the results. FIG. 6 shows the individual and combined hybrid spectra for a $^{60}$Co check source. This graph represents the peak spectrum from an NaI(Tl) detector (602) and a HPGe detector (606). The resulting combined final spectrum (604) shows the high-energy peaks indicative of $^{60}$Co (at approximately 1173 and 1332 keV).

Figure 7:
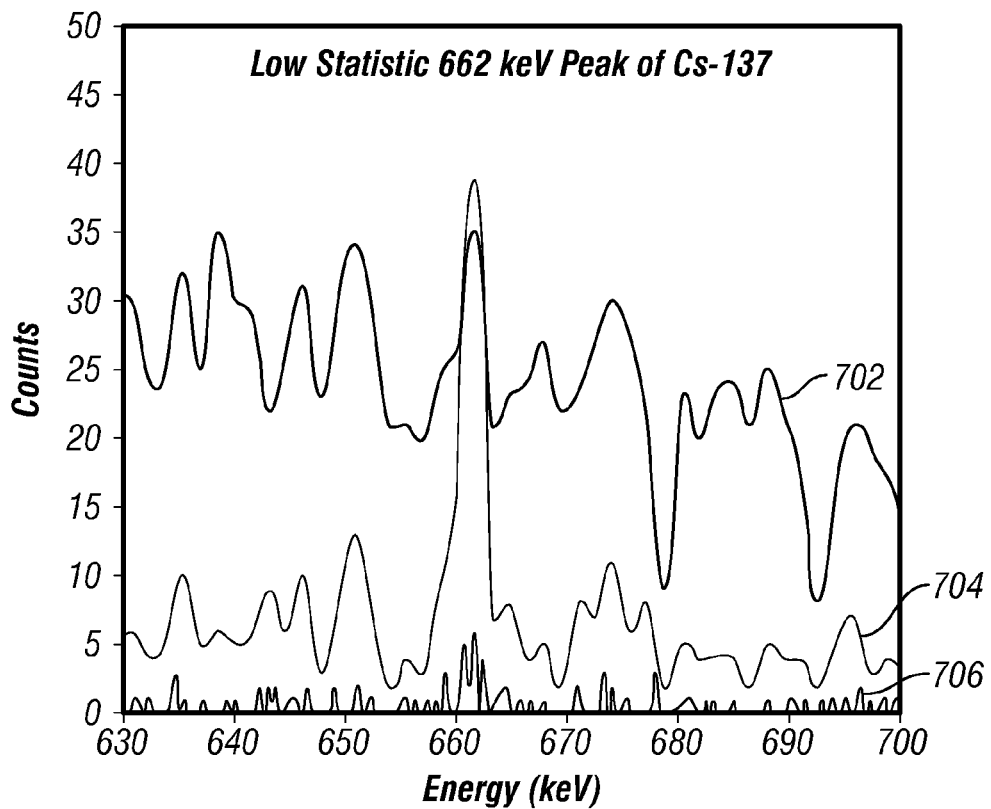
FIG. 7 is a graph of a section of spectrum around the 662 keV peak of $^{137}$Cs with low statistical significance, wherein the hybrid spectrum enhances the distinctiveness of the signal compared to either the NaI(Tl) or HPGe individually.

FIG. 7 shows the individual and combined hybrid spectra for a $^{137}$Cs check source. This graph represents the NaI detector peak spectrum (702) and HPGe detector peak spectrum (706). The resulting combined final spectrum (704) shows the high-energy peak indicative of $^{137}$Cs (at approximately 662 keV).

FIG. 6 and FIG. 7 both show sections of spectra where the combined hybrid spectrum enhances the ability to discern peaks compared to the separate constituent spectra. Even with statistically significant data, the hybrid processing can be beneficial by helping to correctly discern multiplets in the NaI(Tl) spectrum by leveraging the HPGe spectrum, as shown in FIG. 8 and FIG. 9. In FIG. 8 the NaI spectrum (802) and the HPGe spectrum (806) combine using the present embodiment to reflect the $^{60}$Co energy peaks with the hybrid final spectrum (804). In FIG. 9 the NaI spectrum (904) and the HPGe spectrum (906) combine using the present embodiment to reflect the $^{133}$Ba energy peaks with the hybrid final spectrum (902).

Embodiments of present invention are deployable in either software or hardware. Firmware implementations are constructed with the algorithms embedded in processors such as Field Programmable Gate Arrays (FPGA), Application Specific Integrated Circuits (ASIC) and System on a Chip (SoC) embodiments, and the like. Such embodiments and other equivalents are within the scope of the present invention.

A hybrid detection system would combine one or more detectors of different types into a single spectroscopy system. A hybrid detection system might combine one or more higher efficiency, lower resolution detectors with one or more lower efficiency, higher resolution detectors. Some capabilities and benefits of both higher efficiency and better energy resolution can be achieved in a single system. A much greater variety of performance and cost possibilities are available. Examples of various embodiments of the hybrid detection system where hybrid combinations could be beneficial include:

- a large NaI(Tl) scintillation detector combined with a small HPGe semiconductor detector;
- a small NaI(Tl) or CsI(Tl) scintillation detector combined with a smaller CZT semiconductor detector;
- a large NaI(Tl) scintillation detector combined with a smaller LaBr3(Ce) scintillation detector;
- a NaI(Tl) detector combined with a HgI detector; and
- a NaI(Tl) detector combined with a CdTe detector.
- a BGO detector combined with LaBr or NaI or CdZnTe or HPGe
- Whatever combination of two or multiple detectors based on scintillation technique (BGO, NaI(Tl), LaHa, LaCl, HgI, etc. in solid and liquid phase) and/or based on a solid state ionization crystal (like HPGe, CdTe, CdZnTe, SiLi etc.) or gas detectors like Xenon detectors or a kind of noble gases based detectors.

Other combinations are possible and are within the scope of the present invention. Hybrid detection systems utilizing multiple detectors of the same type with common peak features will tend to resonate and be emphasized to a greater degree than just by summing.

As with standard radiation detection systems using the same type of spectroscopic detectors, combining multiple detectors provides the greatest benefit when the amount of additional discernable source signal more than offsets the effect of added noise or background signal. The relative sensitivity of the constituent detectors should be similar and they all need to be exposed to the same source or sources.

One application where an embodiment of the hybrid detection system can be deployed include an advanced spectroscopic portal. Current spectroscopic portal systems typically use either an array of 4"×4"×16" NaI(Tl) detectors or large HPGe semiconductor detectors. The scintillator system operates at room temperature and is able to employ a much greater mass of active detector volume having improved efficiency with lower overall cost than HPGe detectors. However, HPGe detector energy resolution is about 20-30 times better than NaI(Tl). The excellent energy resolution of HPGe allows greater confidence in coping with source masking scenarios and avoidance of excessive false positive identifications. The burden of cryogenic cooling requirements and higher cost of HPGe per unit volume limits the degree of deployment. A hybrid system using a mix of large NaI(Tl) and HPGe allows for a much greater range of cost and performance solutions. Adding higher efficiency large NaI(Tl) to the better energy resolution HPGe allows the efficiency requirements to be met at a lower cost while still retaining much of the selective identification performance.

Yet another application for which an embodiment of the hybrid detection system is a vehicle-borne search system. In such an application, the source is typically at a large distance from the detectors, so overall sensitivity is important. Sensitivity is driven by efficiency and energy resolution, so the ability to enhance efficiency by including larger but less expensive detectors while significantly retaining resolution performance is beneficial.

Another embodiment of the present invention is a handheld radio-isotopic identification system. Efficiency is always an important metric determining how long a detector must be held in the proximity of a source to achieve decisive identification results. Cadmium Zinc Telluride (CZT) detectors have energy resolution several times better than NaI(Tl) at room temperature, but are limited to small sizes because of manufacturing restrictions with limited crystal grain size. The small sizes render proportionally small efficiencies. A hybrid combination of CZT with a reasonably sized NaI(Tl) detector would greatly improve efficiency while retaining the benefit of enhanced resolution.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. While various alterations and permutations of the invention are possible, the invention is to be limited only by the following claims and equivalents (58,266).

We claim:

1. A method for combining the individual spectral data from a plurality of ionizing radiation detectors to produce a single combined spectrum radiation analysis, the method comprising:
   providing a first computing device, wherein the first computing device accepts input from a plurality of calibrated spectroscopic detectors;
   detecting, using the spectroscopic detectors, the radiation level from a radioactive source;
   computing spectral histograms for at least two of the spectroscopic detectors;
   separating the photopeak counts from the underlying continuum counts using baseline estimation for each spectral histogram to create a respective peak spectral array;
   rebinning each peak spectral array to conform to a common energy calibration;
   convolving the rebinned peak spectral arrays to create a convolution array;
   redistributing counts, according to the local convolution array distribution, in each rebinned spectral array over a symmetrical energy region proportional to the respective photopeak shape calibration at the channel energy;
   summing the redistributed counts to obtain the combined spectrum; and preparing a report related to the combined spectrum for display to a user.

2. The method of claim 1 wherein the rebinned spectral arrays are convolved by multiplying photopeak counts plus uncertainty in each energy bin raised to a specified power.

3. The method of claim 1 wherein the rebinned spectral arrays are convolved by multiplying channel values of amplitude weighted photopeak correlations.

4. The method of claim 1 wherein the detectors are of the same type.

5. The method of claim 1 wherein at least one of the detectors is of a different type.

6. The method of claim 1 wherein at least one of the detectors differs in efficiency and/or resolution than the other detectors.

7. A hybrid ionizing radiation detection system, the system comprising:
   two or more ionizing radiation detectors, each with dedicated output conditioning circuitry; and
   a processing device, wherein the processing device performs the method steps comprising:
   (a) obtaining spectral histograms from two or more calibrated spectroscopic detectors;
   (b) separating the photopeak counts from the underlying continuum counts using baseline estimation for each spectral histogram to create a respective peak spectral array;
   (c) rebinning each peak spectral array to conform to a common energy calibration:
   (d) convolving the rebinned peak spectral arrays to create a convolution array;
   (e) redistributing counts, according to the local convolution array distribution, in each rebinned spectral array over a symmetrical energy region proportional to the respective photopeak shape calibration at the channel energy; and
   (f) summing the redistributed counts to obtain the combined spectrum.

8. The system of claim 7 wherein the detectors are of the same type.

9. The system of claim 7 wherein at least one of the detectors is of a different type.

10. The system of claim 7 wherein at least one of the detectors differs in efficiency and/or resolution than the other detectors.

11. The system of claim 7 wherein the rebinned spectral arrays are convolved by multiplying photopeak counts plus uncertainty in each energy bin raised to a specified power.

12. The system of claim 7 wherein the rebinned spectral arrays are convolved by multiplying channel values of amplitude weighted photopeak correlations.

13. A computer readable medium embodying a computer program product, the program product comprising instructions, operable to enable a processing device to execute a procedure for combining the spectral data from a plurality of ionizing radiation detectors to produce a single combined spectrum, the program instructions comprising:
   obtaining the outputs from a plurality of calibrated spectroscopic detectors positioned to detect the radiation level from a radioactive source;
   computing spectral histograms for at least two of the spectroscopic detectors;
   separating the photopeak counts from the underlying continuum counts using baseline estimation for each spectral histogram to create a respective peak spectral array;
   rebinning each peak spectral array to conform to a common energy calibration;
   convolving the rebinned peak spectral arrays to create a convolution array;
   redistributing counts, according to the local convolution array distribution, in each rebinned spectral array over a symmetrical energy region proportional to the respective photopeak shape calibration at the channel energy;
   summing the redistributed counts to obtain the combined spectrum and
   preparing a report related to the combined spectrum for display to a user.

14. The computer readable medium of claim 13 wherein the rebinned spectral arrays are convolved by multiplying photopeak counts plus uncertainty in each energy bin raised to a specified power.

15. The computer readable medium of claim 13 wherein the rebinned spectral arrays are convolved by multiplying channel values of amplitude weighted photopeak correlations.

16. The computer readable medium of claim 13 wherein the detectors are of the same type.

17. The computer readable medium of claim 13 wherein at least one of the detectors is of a different type.

18. The computer readable medium of claim 13 wherein at least one of the detectors differs in efficiency and/or resolution than the other detectors.

* * * * *